Patented Aug. 11, 1925.

1,549,720

UNITED STATES PATENT OFFICE.

WILLIAM J. KELLY AND CLAUDE H. SMITH, OF AKRON, OHIO, ASSIGNORS TO THE GOODYEAR TIRE & RUBBER COMPANY, OF AKRON, OHIO, A CORPORATION OF OHIO.

PROCESS OF MAKING THIOUREAS.

No Drawing. Application filed June 5, 1920. Serial No. 386,750.

*To all whom it may concern:*

Be it known that we, WILLIAM J. KELLY and CLAUDE H. SMITH, citizens of the United States, and residents of Akron, Ohio, have invented new and useful Improvements in Processes of Making Thioureas, of which the following is a specification.

The object of our present invention relates to a process of manufacturing substituted thioureas and is particularly directed to a method whereby the action by which they are produced is greatly hastened and a product of high quality obtained.

The ordinary method in common use for the manufacture of thioureas and of substituted thioureas consists in allowing an excess of carbon bisulfide to react with a primary amine, such as aniline. If pure compounds be used, the action is very slow in starting but it may be speeded up by the addition of a small quantity of sulfur, lead oxide or even of the thiourea itself to the mixture. The reaction has also been somewhat hastened by carrying it out in the presence of hot or boiling alcohol as a solvent but this process considerably increases the cost of manufacture and increases the manipulation necessary in that the solvent used must be recovered.

We have now discovered that certain thioureas and particularly diphenyl-thio-urea and its homologues may be readily manufactured if the reaction be carried out as is hereinafter disclosed at a temperature materially higher than that of boiling alcohol (78° C.). If the temperature of the mixture be increased according to the method as hereinafter described, the period of time required to convert a desired amount of the amine into the substituted thiourea is greatly shortened.

Another feature of our invention is the discovery that the reaction proceeds more satisfactorily if the vapors of carbon bisulfide be introduced into the hot amine. We accomplish this by causing the carbon bisulfide to enter at the bottom of the reacting chamber and then to bubble it at a regulated rate up through the amine. The heating is accomplished by passing the carbon bisulfide through a steam jacketed pipe and thereby heating or super-heating the liquid to any desired temperature but at least to a point sufficient to prevent the condensation of appreciable amounts of vapor. Although it is desirable to introduce the carbon bisulfide in a vapor form into the amine, the herein disclosed process of making thioureas is not inoperative if varying amounts of liquid carbon bisulfide be admitted to the reaction chamber. Due to the cooling effect that would follow, it is desirable, however, to prevent the admittance of any liquid into the hot amine so far as is possible.

The process of practicing our invention is carried out in the following manner. A charge consisting of any desirable amount of a primary amine, for example aniline, is run into a steam jacketed kettle preferably of such a form that the height is considerably greater than its diameter. This is desirable in order to cause the vapors of carbon bisulfide to bubble through and so react with as great a quantity of the amine as is possible. It is often an advantage to add a small amount of some material to catalyze the action. If this be done, we preferably add sulfur in quantities varying from 0.25 to 5% (or more, if desired) of the amount of amine taken. The mass is then heated with constant stirring to a temperature of from 88° to 92° C. (if aniline be used) and a stream of carbon bisulfide vapor is passed into the reaction chamber in the manner as described. The temperature of the reacting mixture should be very slowly increased as the amount of the thio-urea formed becomes greater but should not go higher than 110° to 115° C. during the reaction. The amount of carbon bisulfide added is often in considerable excess of that needed to convert all the amine into thio-urea. In practice, a 100% yield of the product is not usually obtained inasmuch as too much time is required to bring this action to completion but the process may be interrupted when the rate of conversion of amine to thio-urea has materially slackened. We often find that after an action of from four to five hours, approximately 85% of the amine may be changed to thio-urea altho this proportion may of course vary, depending upon the type and size of apparatus used as well as on other factors.

During the course of the reaction, hydrogen sulfide is evolved and this gas, together with whatever carbon bisulfide that escapes reaction is passed through a condenser (to remove the carbon bisulfide) and is then pumped or forced through an aniline scrubber (to remove any carbon bisulfide that escapes condensation) and may then be burned, or otherwise disposed of, as for example, by absorption in caustic solution.

After the addition of carbon bisulfide to the hot amine has been stopped, the mixture is heated to a temperature of 130–135° C. to complete the reaction so far as is possible and to remove all traces of carbon bisulfide from the mixture. The hot mass is then run into a churn which is partially filled with cold water. This plunge into cold water, together with the constant agitation by the stirring paddles, serves to disintegrate the mixture into a finely divided mass and so renders it more readily susceptible to the purification treatment that follows.

Steam is now run into the mixture and if any free amine be present it is removed by distillation. The sludge which remains is then run into a large tank and a considerable part of the water is allowed to drain away through screened openings placed in the bottom of the tank. The material is then removed to an air or vacuum dryer where the last traces of water are removed.

After drying the product is usually lumpy and it is often desirable to crush and sift it to any desired fineness before using it.

Other primary amines than aniline may be used in carrying out this process. The toluidines, the xylidines, amino-di-methyl-aniline, amino-cymene, or, in fact, any organic base of the type known as primary amines which react with carbon bisulfide to produce thio-ureas and preferably those of the aromatic series, may replace aniline in the example as given.

We are not limited to those temperatures mentioned in the example given for these must of necessity vary according to the character of the amine used, the melting point of the mixture obtained or the tendency of the various thio-ureas produced to form guanidine derivatives or other side reaction products but the temperature employed must in every case be above the boiling point of carbon bisulfide and also above the melting point of the mix produced.

It is to be understood that the example as given is illustrative only and that the invention is not limited to the exact procedure, proportions or materials mentioned therein, nor is it dependent upon the accuracy of any theories which we may have advanced by way of explanation except in so far as the limitations may be included within the terms of the accompanying claims in which it is our intention to claim all novelty inherent in our invention as broadly as is permissible in view of the prior art.

What we claim is:—

1. The process of making thio-urea, which consists in adding the vapor of carbon bisulfide to a primary aromatic amine maintained at a temperature between the boiling point of carbon bisulfide and the decomposing temperature of the product.

2. The process of making a thio-urea which consists in adding the super heated vapors of carbon bisulfide to a primary amine of the aromatic series and maintaining the temperature between the boiling point of carbon bisulfide and the decomposing temperature of the product.

3. The process of making diphenyl-thio-urea which consists in adding the vapors of carbon bisulfide to aniline and maintaining the temperature between the boiling point of carbon bisulfide and the decomposing temperature of the product.

4. The process of making diphenyl-thio-urea which consists in adding the super-heated vapors of carbon bisulfide to aniline and maintaining the temperature between the boiling point of carbon bisulfide and the decomposing temperature of the product.

In witness whereof, we have hereunto signed our names.

WILLIAM J. KELLY.
CLAUDE H. SMITH.